United States Patent [19]

Hargrove et al.

[11] Patent Number: 4,974,159
[45] Date of Patent: Nov. 27, 1990

[54] METHOD OF TRANSFERRING CONTROL IN A MULTITASKING COMPUTER SYSTEM

[75] Inventors: Richard R. Hargrove; Phillip R. Barrett; Ralph A. Lipe; Aaron R. Reynolds, all of Redmond; Marc D. Wilson, Seattle, all of Wash.

[73] Assignee: Microsoft Corporation, Redmond, Wash.

[21] Appl. No.: 244,423

[22] Filed: Sep. 13, 1988

[51] Int. Cl.⁵ .............................................. G06F 9/46
[52] U.S. Cl. .................................. 364/200; 364/280; 364/281.3; 364/281.7
[58] Field of Search ........................ 364/200, 300, 900

[56] References Cited
U.S. PATENT DOCUMENTS
4,486,831 12/1984 Wheatley et al. .................... 364/200

Primary Examiner—Raulfe B. Zache
Attorney, Agent, or Firm—Seed and Berry

[57] ABSTRACT

An improved method and system for transferring control in a multitasking computer system is provided. In preferred embodiments for use with 80386 machines, the virtual machine monitor (VMM) writes a virtual machine break point (VMBP) instruction into the executable code of selected DOS routines to cause the DOS routines to transfer control to the VMM. By selecting systems calls of indefinite duration for the application of this method, system performance can be improved. In this preferred embodiment for 80386 machines, 8086 programs designed to run under DOS can be more efficiently executed in a multitasking environment.

9 Claims, 2 Drawing Sheets

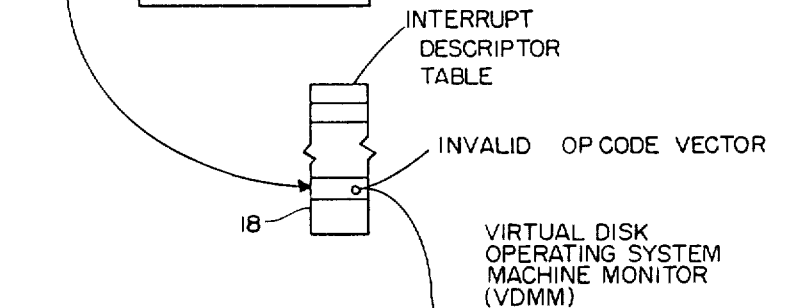
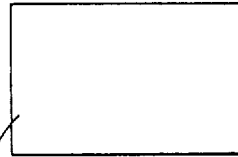
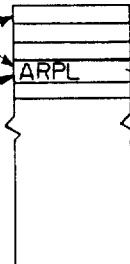
FIG. 3
FIG. 4 the IBM PC and compatible computers, for example. Thus, computers which incorporate the 80286 microprocessor, such as the IBM PC/AT, can run existing 8086 programs written for the IBM PC and compatible computers.

METHOD OF TRANSFERRING CONTROL IN A MULTITASKING COMPUTER SYSTEM

TECHNICAL FIELD

This invention relates multitasking computer systems and methods, more particularly, to a computer method and system for transferring control in a multitasking environment.

BACKGROUND ART

Newly designed microprocessors may include enlarged memory addressing facilities and revised architecture which result in enhanced capabilities. When such microprocessors are used in new computer systems, they often produce computers which are functionally superior to their predecessors due to these enhanced capabilities. Despite any functional advantages a new computer may have over its predecessors, a computer employing an improved microprocessor may not be a commerical success. Computer programs, sometimes referred to as "software," are microprocessor specific. Therefore, when a computer employing a new microprocessor is introduced into the marketplace, there is generally little or no software which can run on it. Existing software, written for previous microprocessors, is incompatible with the new computer. As a result, sales of such new computers will often be sluggish until consumers see that adequate software is available for the computer. Additionally, consumers with libraries of software for existing computers may be reluctant to purchase new computers which would require them to invest in all new software. This problem is often compounded by the fact that software writers and publishers are reluctant to produce software for a new microprocessor until sales of computers incorporating the microprocessor are sufficient to create a relatively large group of potential purchasers of the software. This "wait and see" attitude on the part of both consumers and software writers can jeoparize the success of a new microprocessor and computers using the microprocessor.

Designers of new microprocessors sometimes attempt to solve this problem by designing a new microprocessor such that it will operate in multiple modes. In a first mode, for example, the microprocessor will emulate a prior microprocessor and run existing programs written for the prior microprocessor. In a second mode, the microprocessor will make full use of its enhanced capabilities. Such a design will enable manufacturers of computer systems using the microprocessor to advertise that the entire body of existing programs written for the prior microprocessor will run on their computer, thereby (in theory) stimulating computer sales to a point where software writers will begin to write programs designed to run in the new enhanced mode.

One such microprocessor is the Intel 80286, which is manufactured by the Intel Corporation of Santa Clara, Calif. The design and operation of the Intel 80286 is described in detail in a publication entitled "iAPX286 Programmer's Reference Manual Including the iAPX286 Numeric Supplement," which is available from the Intel Corporation and is hereby incorporated by reference.

The Intel 80286 (hereinafter "80286") operates in two modes. In a first mode, called the "real mode," the 80286 emulates the architecture of Intel's previous 8086, 8088 microprocessor family, which is used in the IBM PC and compatible computers, for example. Thus, computers which incorporate the 80286 microprocessor, such as the IBM PC/AT, can run existing 8086 programs written for the IBM PC and compatible computers.

In a second mode, called the "protected mode," the 80286 architecture provides enlarged memory addressing capability, enhanced multitasking support features, and a sophisticated protection scheme.

Another such microprocessor is the Intel 80386. The design and operation of the Intel 80386 is described in detail in a publication entitled "iAPX386 Programmer's Reference Manual Incuding the iAPX386 Numeric Supplement", which is available from the Intel Corporation and is hereby incorporated by reference.

The 80386, in addition to a real and protected mode as described above for the 80286, has a third mode, called virtual-8086 mode. In virtual-8086 the 80386 emulates the 8086 processor in a manner similar to the real mode. The distinction between real and virtual-8086 mode is that in virtual-8086 mode the 80386 provides memory-management, protection, and multitasking support. The virtual-8086 mode allows 8086 programs to execute as a task on the 80386. Each task in virtual-8086 mode has the illusion that it is executing on a 8086.

A virtual machine monitor (VMM), which is special operating-system software, coordinates the multitasking of several 8086 programs. The VMM executes in protected mode. There are two standard techniques for transferring control from a task to a VMM so that another task can be started. First, the VMM configures the 80386 so that all interrupts, software and hardware, that are executed by an 8086 program cause control to be transferred to the VMM. Second, the VMM sets a timer interrupt. When interrupted after the specified interval, the VMM receives control.

These techniques can be used to support the transfer from 8086 programs that are designed to execute under a disk operating system (DOS). A typical personal computer DOS, such as MS-DOS Version 3.X offered by Microsoft Corporation of Redmond, Washington, is a single-threaded operating system; that is, the DOS is not designed to support a multitasking environment. When the DOS is executed in a multitasking environment, problems can occur when the DOS is interrupted. If the DOS is randomly interrupted during the execution of a function, as an interval timer, then the transfer to another task can cause the DOS data structures to be corrupted. Consequently, a VMM will allow the DOS to complete a function before another task is started. Upon exit from a DOS system call, the DOS data structures are in an appropriate state.

Unfortunately, a VMM that allows all functions calls to complete before transferring tasks will result in poor system performance. Several system calls of DOS may take an indefinite amount of time to complete. For example, a call to retrieve a character from the keyboard will not complete until a key is actually entered. Similarly, if a program issues a system call to read from a communication port, the system call will not complete until a character is actually received. The DOS loops through a section of code checking the port to see if the character has been received. Consequently, no other task can be scheduled for this indefinite period of time.

A timer interrupt of system calls of indefinite duration is insufficient because the VMM does not know whether the DOS was in a state where the data structures were non-corruptable.

SUMMARY OF THE INVENTION

It is an object of the present invention to provide an improved method and system for transferring control in a multitasking computer system.

It is a further object of the present invention to provide such a method and system that will avoid inefficiencies and poor system performance caused by system calls of indefinite duration.

These and other objects, which will be apparent as the invention is more fully described below, are obtained by providing an improved method and system. In preferred embodiments for use with 80386 machines, the virtual machine monitor (VMM) writes a virtual machine break point (VMBP) instruction into the executable code of selected DOS routines to cause the DOS routines to transfer control to the VMM. By selecting systems calls of indefinite duration for the application of this method, system performance can be improved. In this preferred embodiment for 80386 machines, 8086 programs designed to run under DOS can be more efficiently executed in a multitasking environment.

BRIEF DESCRIPTION OF THE DRAWINGS

FIG. 3 is an illustration of the Interrupt Descriptor Table set up in accordance with a preferred embodiment of the invention.

FIG. 4 is an illustration of the ARPL instruction used as the BPL in a preferred embodiment of the invention.

DESCRIPTION OF THE PREFERRED EMBODIMENT

Preferred embodiments of the present invention provide a method of detecting the entry by the DOS into a state where a task switch can occur without corrupting the DOS data structures. This method provides for the insertion of a virtual machine break point (VMBP) instruction into the DOS code at a point where DOS will be executing in such a state, referred to a Break Point Locations (BPL). When the VMBP instruction is executed, the 80386 transfers control from the DOS to the VMM. When the VMM receives control the VMM, it determines that the transfer was caused the execution of a VMBP instruction. The VMM is then free to start another task or perform other functions without corrupting the DOS data structures. A VMM that modifies a DOS is referred to a virtual DOS monitor machine (VDMM).

Figure 1:
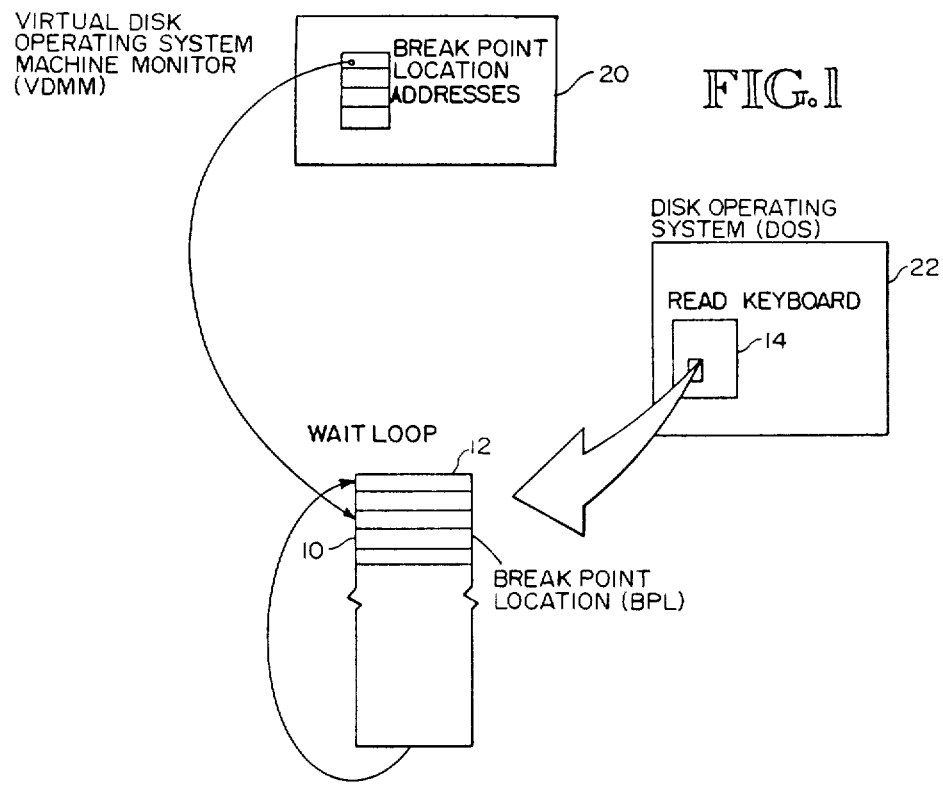
FIG. 1 is an illustration of the VDMM with the BPL addresses loaded in accordance with a preferred embodiment.

In a preferred embodiment, the VDMM uses a copy of the contents of a selected routine where a break point is to be stored to locate the selected routine within DOS. Alternatively, the VDMM could load from a file the BPL addresses for a particular version of DOS 22 under which the application programs are to execute. Alternatively, the BPL addresses could be hard coded into the VDMM 20. FIG. 1 illustrates the VDMM with the BPL addresses loaded.

The BPLs are generally located in DOS system calls of indefinite duration. One such system call is the read keyboard call. FIG. 1 shows a BPL 10 that is within the wait loop 12 for the read keyboard call 24.

Figure 2:
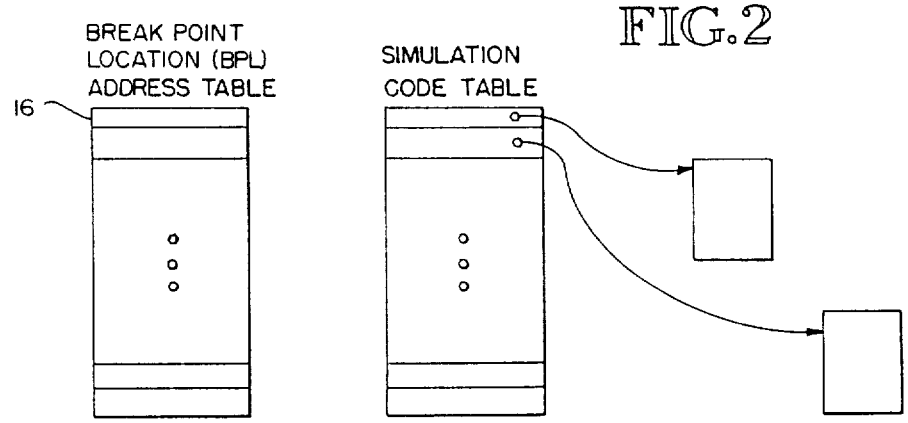
FIG. 2 is an illustration of BPL Address Table and Simulation Code Table in accordance with a preferred embodiment.

Prior to executing its first virtual-8086 mode program that runs under DOS, the VDMM moves a one-byte VMBP instruction to the BPLs in the BPL Address Table 16. Since a DOS instruction is overwritten, the VDMM must eventually execute code to simulate the overwritten instruction. In a preferred embodiment, the VDMM reads the simulation code for each BPL from a file and stores the code as shown in FIG. 2. Alternatively, the VDMM has the simulation code and the Simulation Code Table hard coded.

When the DOS executes the VMBP instruction that has been stored by the VDMM, the 80386 transfers control to the VDMM. In a preferred embodiment for use on an 80386 machine, the VMBP instruction is the Adjust Requested Privilege Level (ARPL) of 80386. Any invalid 1-byte opcode will suffice. The ARPL instruction is not in the 8086 instruction set. Consequently, if a program in the virtual-8086 mode executes an ARPL instruction then an exception, that is, an invalid operation code (opcode) fault, occurs. The exception causes the 80386 to transfer control to the program specified in the Interrupt Descriptor Table (IDT) vector for the invalid opcode fault 18.

When the VDMM starts a task, it initializes the IDT vector for the invalid opcode fault 18 to cause a transfer through a task gate to the VDMM. FIG. 3 illustrates such a setting. When an invalid opcode is executed, the 80386 transfers control to the VDMM and execution begins at the location specified in the IDT vector.

The VDMM checks the address against the BPL Address Table. Based on the segment offset of the faulting ARPL, the VDMM executes the simulation code for that BPL address to simulate the execution of the overwritten instruction. The VDMM then can transfer control to another task in virtual-8086 mode or perform other operating system tasks.

In the preferred embodiment the ARPL is used as the VMBP instruction. However, other VMBP instructions can be used to cause transfer to the VDMM. For example, the INT 3 or similar INT instruction can be used to cause an interrupt to occur and transfer to the VDMM. However, that is a valid 8086 instruction and may be used by application programs. Using a VMBP instruction that has other possible uses is undesirable in that the VDMM must determine whether the instruction is intended as a VMBP.

Using a 1-byte instruction like the ARPL is preferable to using a multi-byte instruction for the VMBP instruction (see FIG. 4). Since the 80386 uses the byte as its unit of addressability, greater care would be needed when selecting the BPL addresses. This greater care is needed to ensure that the DOS would not branch to the middle of the second byte of the VMBP instruction. Also, a multi-byte instruction could make the simulation more difficult because more than one instruction may need to be simulated.

Although the present invention has been described in terms of a preferred embodiment operating on an 80386 machine, the methods and systems of the present machine can be effected on other machines with similar characteristics and with similarly improved results. Modifications within the spirit of the invention will be apparent to those skilled in the art. The scope of the present invention is defined by the claims which follow.

We claim:

1. A method of transferring control in a multitasking computer system having a system monitor and a plurality of programs executing under the system monitor, comprising the steps performed by a computer of:
   writing an inoperative instruction into a selected routine of a program; and
   monitoring the execution of the programs to detect an occurrence of the inoperative instruction and transferring control to the system monitor after detection of the occurrence.

2. The method of claim 1 including the additional step of simulating the execution of the selected routine after control is transferred to the system monitor.

3. The method of claim 1 wherein the inoperative instruction is an invalid operation code.

4. A method of transferring control in a multitasking computer system having virtual mode emulating a single tasking environment, a virtual machine monitor and a plurality of application programs running under DOS in virtual mode, the method comprising the steps performed by a computer of:
   locating a routine in DOS for a system call of indefinite duration; and
   reading into the located routine an inoperative opcode for transferring control to the virtual machine monitor when the located routine is called by an application program.

5. A method of transferring control between DOS and a VDMM in an 80386-compatible computer system, the system including a virtual mode for executing an application program under DOS in a simulated 8086-8088 environment, the computer system having a computer memory, the method comprising the steps of:
   loading the DOS into the computer memory;
   locating a selected DOS routine in the computer memory;
   writing an operation code that is invalid in virtual mode into the selected DOS routine; and
   executing the selected DOS routine with the invalid operation code in virtual mode so that when the invalid operation code is executed, control transfers from the DOS to the VDMM.

6. The method of claim 5 wherein the selected routine is located by storing a portion of the routine to be located in known locations in the computer memory and comparing the contents of the known locations with the contents of the computer memory where the DOS is loaded until a match is found.

7. The method of claim 5 wherein the computer system has an Adjust Request Privilege Level operation code that is invalid in virtual mode and the step of writing an operation code writes the Adjust Request Privilege Level operation code.

8. The method of modifying a selected DOS routine so that the DOS routine will transfer control to a VDMM when executed on a 80386-compatible computer, the computer including a virtual mode for executing an application program under DOS in a simulated 8086-8088 environment, the method comprising the steps performed by a computer of:
   locating the selected DOS routine; and
   writing an operation code that is invalid in virtual mode into the selected DOS routine.

9. The method of claim 8 wherein the computer has an Adjust Request Privilege Level operation code that is invalid in virtual mode and the step of writing an invalid operation code writes the Adjust Request Privilege Level operation code.

* * * * *